United States Patent [19]

Nakata et al.

[11] Patent Number: 4,803,329
[45] Date of Patent: Feb. 7, 1989

[54] WELDER HEAD

[75] Inventors: Syozo Nakata, Hyogo; Satoshi Imai, Aichi, both of Japan

[73] Assignee: Mitsubishi Denki Kabushiki Kaisha, Tokyo, Japan

[21] Appl. No.: 89,804

[22] Filed: Aug. 27, 1987

[30] Foreign Application Priority Data

Aug. 27, 1986 [JP] Japan .................................. 61-200947

[51] Int. Cl.$^4$ ................................................ B23K 9/32
[52] U.S. Cl. ................................ 219/86.25; 219/86.1; 219/119
[58] Field of Search .................. 219/78.01, 86.1, 86.25, 219/86.33, 89, 119

[56] References Cited

U.S. PATENT DOCUMENTS

| 2,810,062 | 10/1957 | Kaunitz | 219/89 |
| 2,998,506 | 8/1961 | Denzler | 219/89 |
| 3,238,352 | 3/1966 | Kollmann et al. | 219/86.25 X |
| 3,798,405 | 3/1974 | Boothe | 219/119 X |
| 4,529,858 | 7/1985 | Scherr | 219/86.1 X |
| 4,572,940 | 2/1986 | Tijs | 219/86.25 |

Primary Examiner—E. A. Goldberg
Assistant Examiner—Lincoln Donovan
Attorney, Agent, or Firm—Sughrue, Mion, Zinn, Macpeak & Seas

[57] ABSTRACT

A welder head comprises a pair of welding electrodes arranged opposite to each other through workpiece to be welded, an electrode holder including a sliding member for holding one of welding electrodes and a support member for supporting the sliding member slidably in an opposing direction of welding electrodes, a pressure mechanism for pressing the one of the welding electrodes toward the other of the welding electrodes through the electrode holder, an elastic member for urging the sliding member toward the opposing direction of the welding electrodes, and a U-shaped electricity feeder provided between the one of the welding electrodes and the support member of the electrode holder and for supplying a welding current to the one of the welding electrodes.

12 Claims, 3 Drawing Sheets

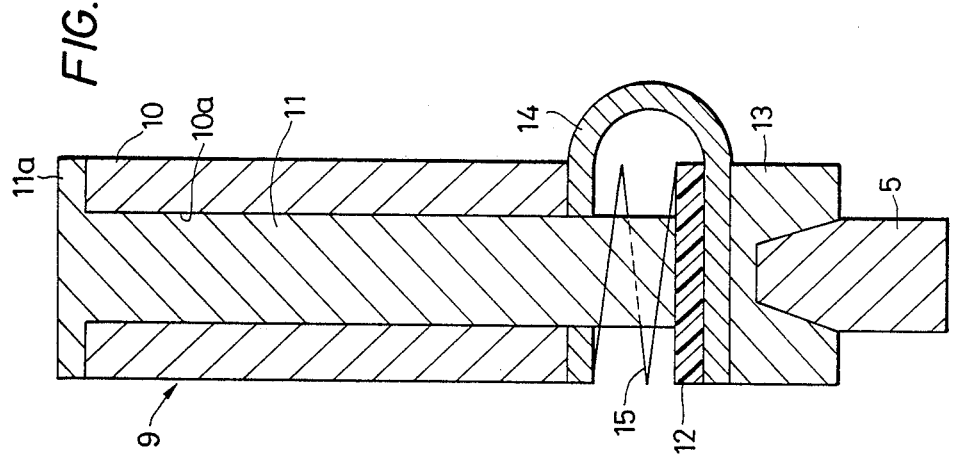
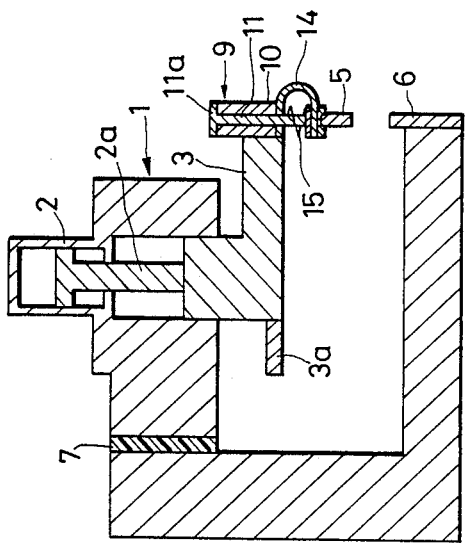

WELDER HEAD

BACKGROUND OF THE INVENTION

The present invention relates to a welder head, particularly to a welder head for an electric welder of an electrode pressure type.

FIG. 6 shows the welder head of a conventional electric welder of an electrode pressure type. A pressure mechanism 2 made of a pneumatic cylinder and so forth is built in the body 1 of the welder head. A guide 3 is provided with a voltage application terminal 3a and is supported by the body 1 of the welder head so that the guide can be moved up and down. An electrode holder 4 is secured to the guide 3. An upper electrode 5 is attached to the bottom of the electrode holder 4. A lower electrode 6 is opposed to the upper electrode 5. An electric insulator 7 electrically insulates the upper electrode 5 and the lower electrode 6 from each other. A spring 8 is provided between the pressure piston rod 2a of the pressure mechanism 2 and the guide 3.

Since the weight load which acts to between the spring 8 downward is exerted by the guide 3, the electrode holder 4 and the upper electrode 5, the constitution and operation of the spring 8 are designed in consideration of the follow-up property of the upper electrode 5 during welding to workpieces to be welded. Some other conventional electric welders of such type are not provided with such a spring.

Next, the operation will be described. When the workpieces are welded to each other by the above-mentioned welder head, the workpieces (not shown) are placed between the upper and the lower electrodes 5 and 6 and the pressure mechanism 2 is operated to press the workpieces on each other. At that time, the pressure is applied to the workpieces through the spring 8, the guide 3, the electrode holder 4 and the upper electrode 5. While the workpieces remain pressed on each other, a voltage is applied between the electrodes 5 and 6 to weld the workpieces to each other.

If the workpieces or the guide 3 undergo a small vibration, the spring 8 absorbs the vibration so that the pressure applied to the workpieces between the electrodes 5 and 6 is kept at a prescribed level while the electrical current is caused to flow through the workpieces.

For the conventional electric welders not provided with such a follow-up spring, the movement of a pressure mechanism 2 is transmitted to an upper electrode 5 through a guide 3 and an electrode holder 4 as it is. When a large current is caused to flow through workpieces to weld them to each other, an electromagnetic force is generated along the passage of the current to reduce the pressure on the workpieces between an upper and a lower electrode.

Since the spring 8 is provided between the pressure mechanism 2 and the guide 3 in the conventional welder head shown in FIG. 6, the weight load which acts on the spring is large and the mass which affects the inertia of a portion including the upper electrode 5 is large so that the follow-up property of the upper electrode to the workpieces is deteriorated. For that reason, when a large current is caused to momentarily and impulsively flow through the workpieces to weld them to each other under pressure, the electrode or the vicinity thereof vibrates to cause the decrease in the thickness of melt of each workpiece or cause the like, and further, the electrode is made separated from the workpieces or the pressure is instantaneously reduced. As a result, the welding of the workpieces is made defective.

SUMMARY OF THE INVENTION

The present invention is intended to solve the above-mentioned problem.

Accordingly, it is an object of the present invention to provide a welder head in which the follow-up property of an electrode to workpieces to be welded is improved to enable good welding.

In the welding head of the present invention, at least one of opposing welding electrodes is movably supported by an electrode holder, an elastic member for urging the movably supported electrode toward the other electrode is provided at the electrode holder, and the movably supported electrode and the electrode holder are connected to each other through a U-shaped flexible electricity feeder.

Since the weight load which acts on the elastic member is exerted by only the movably supported electrode and a portion supporting the electrode, the mass which affects the inertia of the movably supported electrode is much reduced. Besides, electromagnetic forces which are generated when a welding current is caused to flow through the U-shaped flexible electricity feeder, act to elastically bend the feeder in the direction of pressure on the workpieces. As a result, the follow-up property of the movably supported electrode to the workpieces is improved to enable good welding.

BRIEF DESCRIPTION OF THE DRAWINGS

FIG. 1 is a sectional view showing a welder head according to an embodiment of the present invention;

FIG. 2 is a detailed sectional view showing the movably supported electrode of the welder head of FIG. 1 and the vicinity thereof;

DETAILED DESCRIPTION OF THE PREFERRED EMBODIMENTS

Embodiments of the present invention will be described with reference to the drawings.

Figure 3:
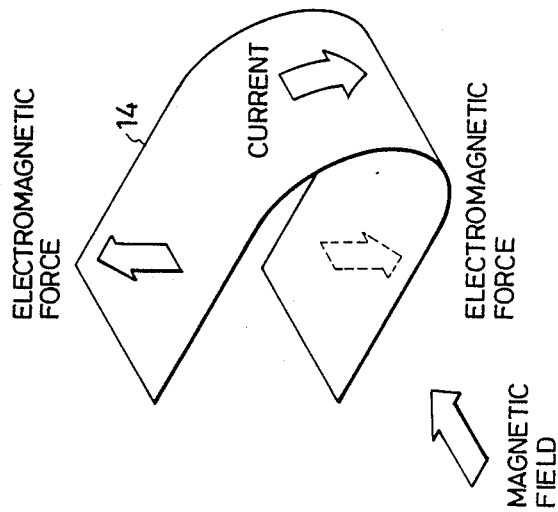
FIG. 3 is an explanatory view for describing the relation between a magnetic field and electromagnetic forces which are generated by a welding current flowing through an electricity feeder.

FIGS. 1, 2 and 3 show the first embodiment of a welder head according to the present invention. FIG. 1 is a sectional view showing the entire welder head. FIG. 2 is a sectional view showing a major part of the welder head. FIG. 3 is an explanatory view of an electricity feeder.

Figure 6:
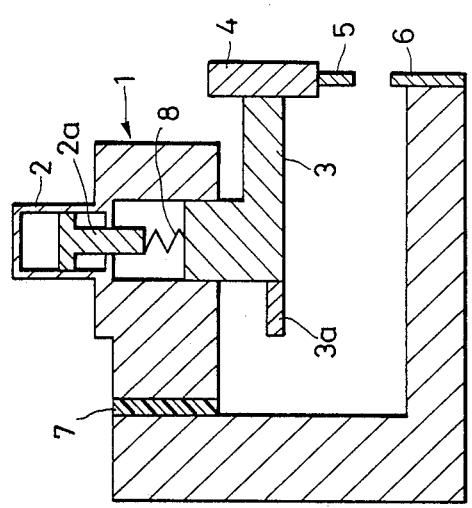
FIG. 6 is a sectional view showing a conventional welder head.

The same characters in FIGS. 1 and 6 denote the same portions, which are not described in detail hereinafter. The following description is mainly concerned with such parts that are different from those of the welder head shown in FIG. 6.

As shown in FIGS. 1 and 2, a guide 3 is directly coupled to a piston rod 2a of a pressure mechanism 2. An electrode holder 9 provided on the guide 3 comprises a support member 10 secured to the guide and having a vertical through hole 10a, and a sliding member 11 fitted in the hole 10a so that the sliding member is vertically slidable. The top flange 11a of the sliding member 11 prevents it from dropping off. A support 13 for an upper electrode 5 is attached through an electric insulator 12 to the projecting bottom of the sliding member 11. The support 13 and the bottom of the support member 10 are connected to each other through a U-shaped flexible electricity feeder 14. An elastic member 15 such as a plate spring or a coil spring is provided between the bottom of the support member 10 and the electric insulator 12 opposed thereto, so that the elastic member urges the sliding member 11 together with the upper electrode 5 toward a lower electrode 6 when workpieces to be welded are pressed on each other.

The operation of the thus constructed welder head will be described. When the workpieces are to be welded to each other, they are placed between the upper and the lower electrodes 5 and 6 and the pressure mechanism 2 is operated to move down the guide 3 together with the electrode holder 9 to press the workpieces between the upper and the lower electrodes. At that time, the pressure of the pressure mechanism 2 is transmitted to the workpieces through the guide 3, the support member 10 of the electrode holder 9, the elastic member 15 and the electrode support 13 to pinch the workpieces between the upper and the lower electrodes 5 and 6. When a welding voltage is applied through a terminal 3a, under such condition, an electrical current flows through the workpieces between the upper and the lower electrodes 5 and 6 to weld the workpieces. The welding current flows through the terminal 3a, the guide 3, the support member 10, the electricity feeder 14, the electrode support 13, the upper electrode 5, the workpieces and the lower electrode 6.

When a large current is caused to momentarily and impulsively flow through the workpieces under pressure to weld the workpieces to each other, the electrodes and the vicinity thereof are vibrated due to the current. However, the weight load which acts on the elastic member 15, that is, the weight of the electrode 5, the support 13 and the sliding member 11 is much less than that of the guide 3 and so on of the conventional welder head shown in FIG. 6. Namely, the mass which affects the inertia of the upper electrode 5 is much smaller, so that the follow-up property of the electrode 5 to the workpieces is good enough to keep the pressure on the workpieces constant. For that reason, the separation of the upper electrode 5 from the upper workpiece, the instantaneous decrease in the pressure on the workpieces or the like is prevented to enable good welding.

When the welding current flows through the U-shaped electricity feeder 14 as shown by an arrow in FIG. 3, a magnetic field and electromagnetic forces, whose directions are shown by other arrows in FIG. 3, are generated (the directions of the electromagnetic forces do not change even if that of the welding current is reversed). That is, the electromagnetic forces act in the directions to increase the distance between the open ends of the U-shaped electricity feeder 14 to assist the follow-up property of the upper electrode 5 so that the welding of the workpieces are further improved.

Figure 4:
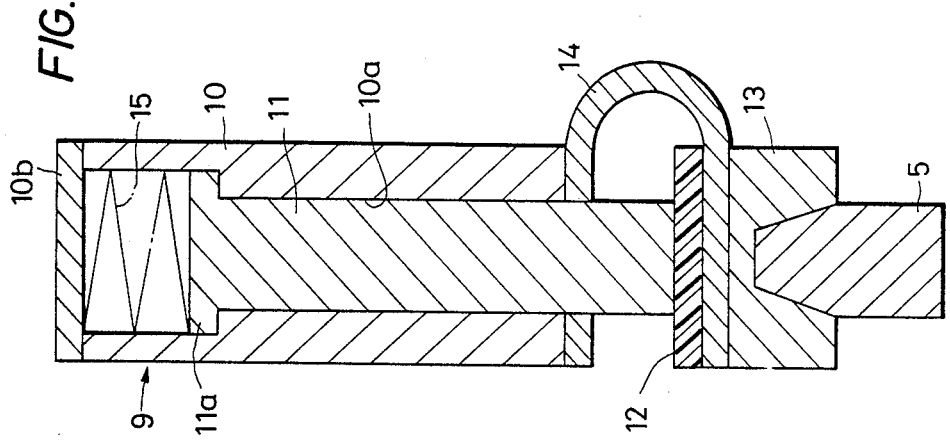
FIG. 4 is a welder head according to another embodiment of the present invention.

FIG. 4 is a sectional view showing the second embodiment of the present invention. The difference of the second embodiment from the first embodiment is that an elastic member 15 is provided in the upper portion of a support member 10 and located between the flange 11a of a sliding member 11 and a cover 10b. The elastic member 15 urges an upper electrode 5 downward together with the sliding member 11.

The second embodiment also provides the same effects as those of the first embodiment. Besides, since the elastic member 15 is housed in the support member 10, an electrode holder is simplified and protected from the thermal influence of welding.

Figure 5:
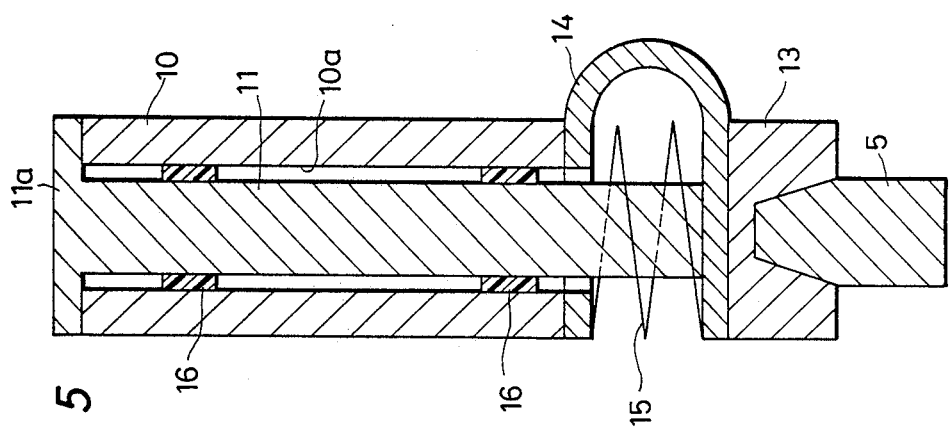
FIG. 5 is a welder head according to still another embodiment of the present invention.

FIG. 5 is a sectional view showing the third embodiment of the present invention. The difference of the third embodiment from the first embodiment is that the sliding member 11 of an electrode holder 9 is supported by electrically-insulating thrust bearings 16 in the through hole 10a of a support member 10 so as to be slidable vertically.

The third embodiment also provides the same effects as those of the first embodiment. Besides, an electric insulator between the sliding member 11 and an electrode support 13 can be omitted.

The location of the elastic member 15 of the present invention is not confined to that described above but may be in the intermediate portion of the support member 10 or in the like. Also, the application of above-described supporting manner of electrode is not confined to only the upper electrode 5 but may be applied to the lower electrode 6 as well.

As described above, according to the present invention, the weight load which acts to the elastic member, that is, the mass which affects the inertia of the movably supported electrode is much reduced. Besides, electromagnetic forces which are generated when a welding current flows through the U-shaped flexible electricity feeder, act to the feeder in the direction of assisting the follow-up property of the electrode. As a result, the follow-up property of the movably supported electrode to the workpieces is much improved to enable good welding.

What is claimed is:

1. A welder head, comprising:
   a pair of welding electrodes arranged opposite to each other, workpieces to be welded being placed between said welding electrode;
   an electrode holder including a sliding member for holding one of said welding electrodes and a support member for supporting said sliding member for slidable movement in a first direction;
   a pressure mechanism for pressing said one of said welding electrodes toward the other of said welding electrodes;
   an elastic member for urging said sliding member in said first direction; and
   a flexible U-shaped electricity feeder having two legs provided between said one of said welding electrodes and said support member of said electrode holder with both legs surrounding said sliding member, for supplying a welding current to said one of said welding electrodes, wherein open ends of said U-shaped electricity feeder are separated from each other by electromagnetic forces generated by a current flowing through said U-shaped electricity feeder.

2. A welder head as claimed in claim I, wherein said pressure mechanism comprises a pneumatic cylinder.

3. A welder head as claimed in claim 2, wherein said pressure mechanism includes a piston rod, said welder head further comprising a guide directly connected to said piston rod of said pressure mechanism, said electrode holder being fixed to said guide.

4. A welder head as claimed in claim 3, wherein said electrode holder is moved in said direction of said welding electrodes by said piston rod through said guide.

5. A welder head as claimed in claim 1, wherein said support member of said electrode holder has a vertical through hole in a central portion of said support member and said sliding member is slidable in said through hole.

6. A welder head as claimed in claim 5, wherein said sliding member has a flange portion at an upper portion of said sliding member and said one of said electrodes is held at a lower end of said sliding member.

7. A welder head as claimed in claim 6, wherein said elastic member is provided between said support member and said one of said welding electrodes.

8. A welder head as claimed in claim 6, wherein said elastic member is contained in said support member and is provided between said flange portion of said slide member and a cover on an upper end of said support member.

9. A welder head as claimed in claim 6, said elastic member is a plate spring.

10. A welder head as claimed in claim 6, said elastic member is a coil spring.

11. A welder head as claimed in claim 5, further comprising electrically insulating thrust bearings provided between said support member of said electrode holder and said sliding member.

12. A welder head as claimed in claim 1, wherein said one of said welding electrodes is supported by an electrode support, said electrode support being held by said slide member through an electrically insulating member.

* * * * *